(12) United States Patent
Ishiwata

(10) Patent No.: US 6,404,545 B1
(45) Date of Patent: Jun. 11, 2002

(54) OPTICAL APPARATUS AND MICROSCOPE

(75) Inventor: Hiroshi Ishiwata, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/656,165

(22) Filed: Sep. 6, 2000

(30) Foreign Application Priority Data

Sep. 7, 1999 (JP) .......................................... 11-253097

(51) Int. Cl.$^7$ ............................................. G02B 21/00
(52) U.S. Cl. ...................... 359/371; 359/235; 359/386
(58) Field of Search ................................ 359/368, 370, 359/371, 385, 386, 389, 234, 235

(56) References Cited

U.S. PATENT DOCUMENTS

| 5,751,475 A | 5/1998 | Ishiwata et al. ............ 359/387 |
| 5,764,363 A | * 6/1998 | Ooki et al. .................. 356/364 |
| 5,969,855 A | 10/1999 | Ishiwata et al. ............ 359/386 |

FOREIGN PATENT DOCUMENTS

| JP | 7-225341 | 8/1995 |
| JP | 9-015504 | 1/1997 |
| JP | 11-023372 | 1/1999 |

OTHER PUBLICATIONS

Wilson et al: "Confocal microscopy by aperture correlation", Optics Letters, Dec. 1, 1996, vol. 21, No. 23, pp. 1879–1881.

Ishiwata et al: "Retardation modulated differential interference misroscope and its application to 3–D shape measurement", SPIE, vol. 2873/21, 4 pages.

Corle et al: "Differential interference contrast imaging on a real time confocal scanning optical microscope", Applied Optics, Sep. 10, 1990, vol. 29, No. 26, pp. 3769–3774.

\* cited by examiner

Primary Examiner—Mark A. Robinson
(74) Attorney, Agent, or Firm—Pillsbury Winthrop LLP

(57) ABSTRACT

An optical apparatus and a microscope are designed so that high resolution and a high sectioning effect are provided; a time for obtaining an output image can be reduced; it is possible to observe the interior of an object in which light is strongly scattered, without using the fluorescent pigment; resistance to vibration is strong and observations can be carried out with high resolution; and a lamination structure of an IC pattern configured on a semiconductor wafer can also be observed.

21 Claims, 6 Drawing Sheets

OPTICAL APPARATUS AND MICROSCOPE

BACKGROUND OF THE INVENTION

1. Field of the Invention

This invention relates to a microscope for observing the interior of the specimen of an organism, such as a living body, and the structure of an IC pattern configured on a semiconductor wafer and to an optical apparatus, such as an observation apparatus, using the microscope.

2. Description of Related Art

For the observation of fine structure inside a living body and the structural analysis of a semiconductor pattern, a microscope that has high resolution and a high sectioning effect is desired. As the microscope of this type, a confocal microscope has been used in which confocal pinholes are arranged at a position conjugate with an object to be observed. Two types of confocal microscopes are known. One of them is a laser scanning confocal microscope and the other is a Nipkow disk scanning confocal microscope. The laser scanning confocal microscope requires a relatively long scanning time to obtain an observation image of an object because the object is scanned with a laser beam. A confocal microscope improved to reduce this scanning time is the Nipkow disk scanning confocal microscope.

In the Nipkow disk scanning confocal microscope, however, confocal pinholes configured on the Nipkow disk must be spaced as far apart as possible in order to secure a sufficient confocal effect. This causes the problem of impairing the efficiency of utilization of light from a light source.

A confocal microscope designed to solve this problem of the Nipkow disk scanning confocal microscope is set forth in "Confocal microscopy by aperture correlation", T. Wilson, R. Juskaitis, M. A. A. Neil, and M. Kozubek, OPTICS LETTERS, Vol. 21, No. 23, pp. 1879-1881. This confocal microscope is such that the confocal pinholes are arranged at random to thereby improve the efficiency of utilization of light from a light source, and consequent impairment in confocal effect is avoided by obtaining an image formed through randomly arranged pinholes and a bright-field image formed without using the pinholes to make a differential calculation relative to these images.

In recent years, research has been pursued on a technique of observing the structure of an object in which light is strongly scattered as in the interior of a living body. For such techniques, techniques based on optical coherence tomography are disclosed in many publications including Japanese Patent Preliminary Publication No. Hei 11-23372.

Apart from the optical coherence tomography, techniques of deriving only phase information from image information of objects are disclosed by the present inventor in Japanese Patent Preliminary Publication Nos. Hei 7-225341 and Hei 9-15504.

In particular, a differential interference contrast microscope (DIC microscope) set forth in Hei 9-15504 is used as a phase modulation DIC microscope and its effect is discussed in "Retardation modulated differential interference microscope and its application to 3-D shape measurement", H. Ishiwata, M. Itoh, and T. Yatagai, Proc. SPIE, Vol. 2873, pp. 21-24 (1996).

A technique of using the laser scanning microscope to extract phase information is disclosed in Japanese Patent Preliminary Publication No. Hei 9-15503.

An example where the Nipkow disk scanning microscope is combined with the DIC microscope to realize a real-time confocal DIC microscope is disclosed in "Differential interference contrast imaging on a real time confocal scanning optical microscope", T. R. Corle and G. S. Kino, APPLIED OPTICS, Vol. 29, No. 26, pp. 3769-3774.

According to an observation technique disclosed in each of Hei 7-225341 and Hei 9-15504, only phase information can be extracted from the observation image of an object, and thus an image with high contrast can be obtained with respect to the sample of a living body or a semiconductor. Moreover, since the phase information is detected, a sectioning effect is better than that of a conventional microscope in which the intensity of light is detected.

By combining this technique with the Nipkow disk scanning confocal microscope, the contrast and the sectioning effect can be further improved. This is disclosed in "Differential interference contrast imaging on a real time confocal scanning optical microscope", T. R. Corle and G. S. Kino, APPLIED OPTICS, Vol. 29, No. 26, pp. 3769-3774. This publication, however, does not in any way suggest a solution for a problem relative to the efficiency of utilization of light from a light source in the Nipkow disk scanning confocal microscope.

By a combination of a phase detection technique disclosed in each of Hei 7-225341 and Hei 9-15504 and a confocal microscope described in "Confocal microscopy by aperture correlation", T. Wilson, R. Juskaitis, M. A. A. Neil, and M. Kozubek, OPTICS LETTERS, Vol. 21, No. 23, pp. 1879-1881, the problem relative to the efficiency of utilization of light from a light source can be eliminated. However, the image formed through the randomly arranged pinholes and the bright-field image must be processed in a state where their phases are inverted, and four pieces of image information are required to obtain one confocal image. This gives rise to the problem of spending much time to obtain the confocal image.

The confocal microscope, although high in resolution and sectioning effect, is often used for a fluorescence observation by applying fluorescent pigment with respect to a method of observing an object with low reflectance, such as an organism specimen. This microscope is difficult to use a method of observing the object by light transmission or without using the fluorescent pigment, and thus this method is seldom used. As the reason for this, it is conceivable that light is strongly scattered inside the organism specimen.

In this respect, as mentioned above, when the optical coherence tomography disclosed, for example, in Hei 11-23372 is employed, it is possible to observe the interior of an object in which light is strongly scattered, such as the interior of a living body.

Even with the use of the optical coherence tomography, however, there are the problems that an optical system used does not form a common optical path and thus is subject to vibration, lateral resolution is low because an interferometer is used as it is, and an apparatus used is considerably large and becomes cumbersome.

SUMMARY OF THE INVENTION

It is, therefore, an object of the present invention to provide an optical apparatus and a microscope in which high resolution and sectioning effect are obtained and time required to obtain an output image is reduced.

It is another object of the present invention to provide an optical apparatus and a microscope in which the interior of an object that light is strongly scattered, such as the interior of a living body, can be observed without using fluorescent pigment and in which resistance to vibration is strong and observations can be carried out with high resolution.

It is still another object of the present invention to provide an optical apparatus and a microscope in which a lamination structure of an IC pattern configured on a semiconductor wafer, as well as the interior of a living body, can be observed.

In order to achieve these objects, according to one aspect of the present invention, the optical apparatus includes a light source; an illumination optical system for leading light emitted from the light source to an object to be observed; an imaging optical system for magnifying and projecting an image of the object; an aperture member which is rotatable, disposed at an image plane of the imaging optical system or its conjugate plane, and having an aperture section constructed with light-transmitting areas and light-blocking areas; a light-separating means for separating the light emitted from the light source into orthogonally polarized components; a light-combining means for combining the polarized components separated by the light-separating means, disposed in the imaging optical system; a polarized-light extracting means for deriving only a particular polarized component, interposed between the light-combining means and the image plane of the imaging optical system; an image sensor for picking up a magnified image of the object projected on the image plane of the imaging optical system; an image processor for storing an image obtained by the image sensor and using this image to perform a calculation; and a phase changer for changing a phase difference between the orthogonally polarized components, interposed between the light source and the light-separating means or between the light-combining means and the image sensor. The light-transmitting areas and the light-blocking areas of the aperture member have boundaries formed in the range from the vicinity of the center of rotation of the aperture member to the vicinity of the periphery thereof so that a differential image is formed by performing a differential calculation with respect to respective corresponding pixels from at least two differential interference contrast images in which the amounts of phase differences between their respective two polarized components are nearly the same, but have different signs.

According to another aspect of the present invention, the optical apparatus includes a light source; an illumination optical system for leading light emitted from the light source to an object to be observed; an imaging optical system for magnifying and projecting an image of the object; an aperture member which is rotatable, disposed at an image plane of the imaging optical system or its conjugate plane, and having an aperture section constructed with light-transmitting areas and light-blocking areas; a light-separating means for separating the light emitted from the light source into orthogonally polarized components; a light-combining means for combining the polarized components separated by the light-separating means, disposed in the imaging optical system; a polarized-light extracting means for deriving only a particular polarized component, interposed between the light-combining means and the image plane of the imaging optical system; an image sensor for picking up a magnified image of the object projected on the image plane of the imaging optical system; an image processor for storing an image obtained by the image sensor and using this image to perform a calculation; and a phase changer for changing a phase difference between the orthogonally polarized components, interposed between the light source and the light-separating means or between the light-combining means and the image sensor. The light-transmitting areas and the light-blocking areas of the aperture member have boundaries formed in the range from the vicinity of the center of rotation of the aperture member to the vicinity of the periphery thereof and boundaries shaped like concentric circles so that a differential image is formed by performing a differential calculation with respect to respective corresponding pixels from at least two differential interference contrast images in which the amounts of phase differences between their respective two polarized components are nearly the same, but have different signs.

The microscope according to the present invention includes a light source; an illumination optical system for leading light from the light source to an object to be observed; an imaging optical system for magnifying and projecting an image of the object; an aperture located at the pupil position of the illumination optical system; and a phase plate which is similar to an aperture, located at a position conjugate with the aperture placed in the illumination optical system through the object. The microscope further includes an aperture member comprised of a plurality of minute apertures whose positions are changed with time, placed at an image plane of the imaging optical system or its conjugate plane.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of specific embodiments, the function of the present invention will be explained.

Figure 1:
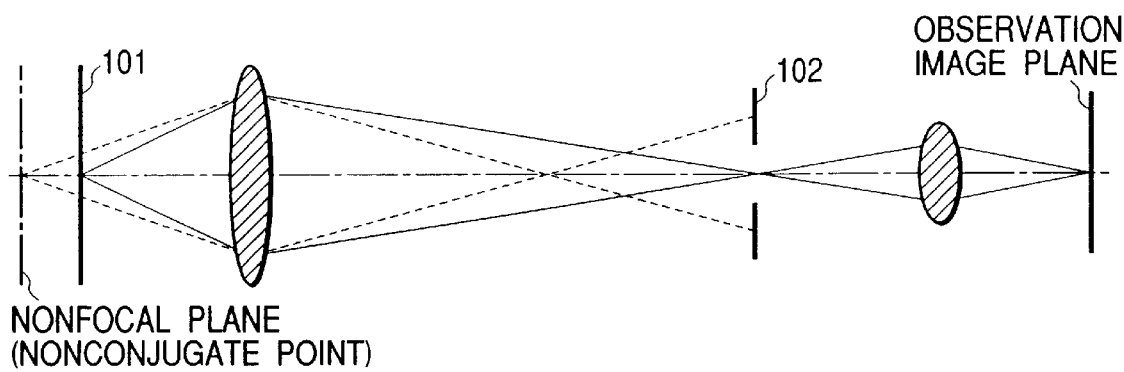
FIG. 1 is a view for explaining the principle of a confocal microscope.
Figure 2:
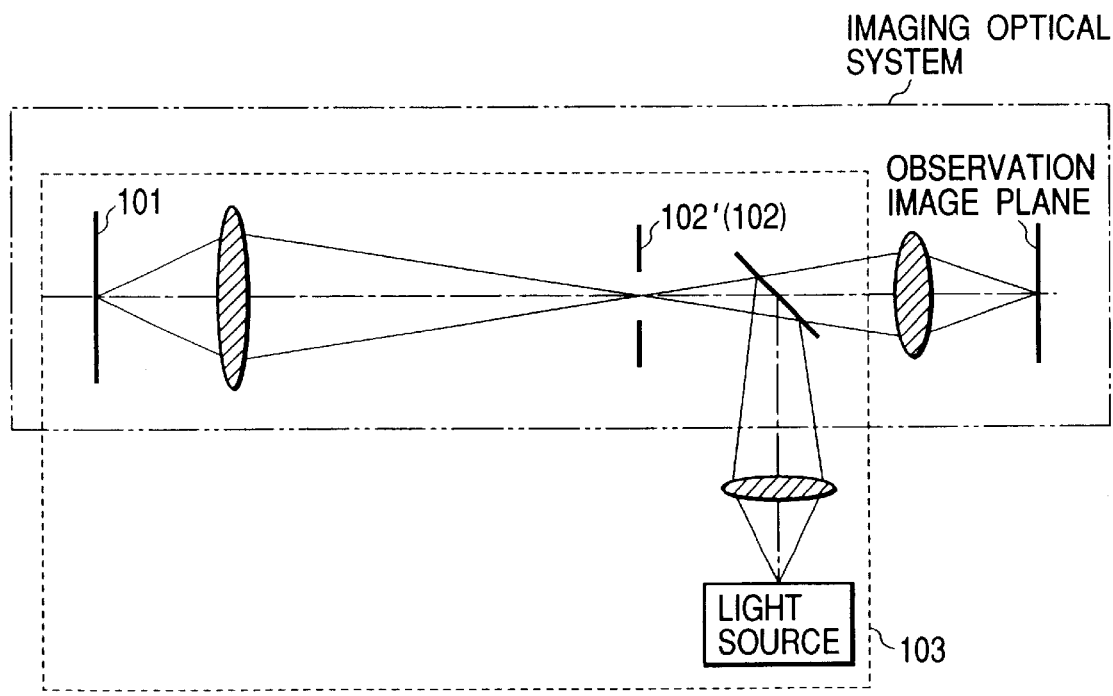
FIG. 2 is a view for explaining a confocal microscope in which an illumination optical system is added to the arrangement of FIG. 1.

Using FIGS. 1 and 2, the principle of a confocal microscope is first described. When an imaging optical system, as shown in FIG. 1, is constructed so that an aperture 102 is disposed at a position conjugate with an observation object surface 101 and an image of an object is observed through the aperture 102, for example, light originating from some position other than that conjugate with the aperture 102, as indicated by broken lines in the figure, is intercepted by the light-blocking portion of the aperture 102 and diminishes in intensity. As shown in FIG. 2, when an arrangement is made so that an aperture 102' is also disposed in an illumination optical system 103 and the object is illuminated with a spot, the intensity of illumination light is materially decreased at some position other than, that conjugate with the aperture 102' disposed in the illumination optical system 103. Thus, the aperture 102' disposed in the illumination optical system 103' is also used as the aperture 102 disposed at the image plane, and thereby a marked difference of intensity is raised between light from the object surface 101 illuminated with the spot and light from a position other than that of the object surface 101. Consequently, a confocal effect is brought about. By scanning the aperture 102, the confocal effect can be secured at any point of the object surface 101. For the scan of this aperture, there is the technique that a Nipkow disk is located at a position conjugate with the object surface 101 and is rotated. The above microscope constructed so that the aperture is scanned through this technique is referred to as a Nipkow disk scanning confocal microscope.

The present inventor analyzes the imaging characteristics of microscopes by using a partially coherent imaging theory and brings out the imaging characteristics of the DIC microscope and the phase-contrast microscope. The result is disclosed in detail, for example, in each of Japanese Patent Preliminary Publication Nos. Hei 7-225341 and Hei 9-15504 and "Retardation modulated differential interference microscope and its application to 3-D shape measurement", H. Ishiwata, M. Itoh, and T. Yatagai, Proc. SPIE, Vol. 2873, pp. 21-24 (1996), mentioned above.

From the result analyzed by the present inventor, image information I (x) of an object to be observed with the DIC microscope or the phase-contrast microscope can be expressed by $$I(x, \theta) = \cos\theta \cdot B(x) + \sin\theta \cdot P(x) \quad (1)$$

where B (x) is the intensity information of the object, to which a bright-field image corresponds, P (x) is the phase information of the object indicative of a phase distribution, to which a differential interference contrast image corresponds, and $\theta$ is the amount of phase difference between two polarized components in the DIC microscope or the amount of phase change brought about by the phase plate of the phase-contrast microscope.

Consequently, two differential interference contrast images or phase-contrast images of $\pm\theta$ in which the amounts of phase differences are nearly equal, but have different signs, are picked up to form a differential image, and thereby phase information can be extracted from the differential interference contrast images or the phase-contrast images. For the image formed by the phase-contrast microscope or the DIC microscope, only the phase distribution of the object within a focal depth is imaged as the phase information.

In the phase distribution of an object outside the limit of the focal depth, the phase of light forming the image is brought to a random state by the defocus characteristic of the imaging optical system, and the phase information is changed to the intensity information like the bright-field information. Hence, the phase component of the image formed by the phase-contrast microscope or the DIC microscope includes only the phase distribution information of the object within the focal depth.

In this way, when the phase component is extracted from the image formed by the phase-contrast microscope or the DIC microscope, only the phase distribution within the focal depth can be obtained. In addition, by placing an aperture member at the image plane, light from a position other than that conjugate with the aperture member can be blocked, and unnecessary intensity information can be eliminated.

Thus, the image obtained through the aperture member placed at the image plane of the imaging optical system is picked up, and thereby, of light incident from the object on the imaging optical system, light from a position other than that conjugate with the aperture member can be blocked. Furthermore, when the phase information is extracted from this image, the influence of the intensity information can be lessened, and the S/N ratio in phase extraction can be improved.

The aperture member has the effect of weakening intensity information obtained from a place other than its conjugate point, and the Nipkow disk can be used as the aperture member. However, in view of the fabrication efficiency of the aperture member, it is desirable that the aperture pattern of the aperture member is simply shaped into a lattice-, slit-, or minute circle-like form.

Where the phase at any point of the object surface is detected under incoherent illumination, any point of the object surface, as in the case of spot illumination in the confocal microscope, is independently illuminated, and the phase information is extracted through a group of minute apertures of the aperture member placed at the image plane or its conjugate plane. As such, the same effect as in the confocal microscope is obtained.

In particular, when there are scattered objects before or behind the observation object, part of light transmitted through the scattered objects is scattered by the scattered objects, and scattered light is brought to a state of random phase and behaves like a bright-field component. In the case of the observation of an object that a great degree of scattering of light is caused as in the interior of a living body, the aperture member with a group of minute apertures is located at a position conjugate with the image plane, and thereby the influence of scattered light can be lessened.

When the phase information is extracted from an image on which the influence of scattered light is slight, obtained through the group of minute apertures, the S/N ratio of the phase information is higher than in the case where phase information is extracted from an image which undergoes a great influence of scattered light.

As set forth in "Confocal microscopy by aperture correlation", T. Wilson, R. Juskaitis, M. A. A. Neil, and M. Kozubek, OPTICS LETTERS, Vol. 21, No. 23, pp. 1879-1881, if the spacing between confocal apertures is decreased in the confocal microscope, the mix of the bright-field image will occur as expressed by $$F(x, t) = S(x) + \alpha(t)B(x) \quad (2)$$

where F (x, t) is an intensity distribution where the spacing between apertures is decreased, t is the spacing between apertures, S (x) is a confocal image, $\alpha$ (t) is a constant governed by the spacing between apertures, and B (x) is the intensity distribution of the bright-field image.

Hence, even when the spacing between confocal apertures is decreased, the confocal image S (x) can be obtained by prestoring the intensity distribution B (x) of the bright-field image and by properly selecting the constant $\alpha$ (t) to make a calculation.

It is considered that even the DIC microscope or the phase-contrast microscope, when combined with the Nipkow disk scanning confocal microscope, possesses the same characteristic as in an ordinary Nipkow disk scanning confocal microscope. The same also holds for the mixing characteristic of a nonconfocal image where the spacing between confocal apertures is decreased. Therefore, in this case, even when the spacing between confocal apertures is decreased, the intensity distribution B (x) of the bright-field image is prestored to make a calculation, and thereby the confocal image S (x) can be obtained.

When the phase-contrast microscope or the DIC microscope disclosed by the present inventor in Hei 7-225341 or Hei 9-15504 is combined with the confocal microscope discussed by T. Wilson et al., phase information can be separated and extracted by performing a differential calculation, from Eq. (1), with respect to two images of ±θ in which the amounts of phase differences are nearly equal, but have different signs. In this instance, if a differential image is formed from a confocal image obtained by the technique discussed by T. Wilson et al., the separation and extraction of phase information that has a confocal effect become possible. However, by forming the differential image, bright-field information including blurred image components can at the same time be eliminated. Hence, even though arithmetic processing discussed by T. Wilson et al. is not performed, a phase-contrast image or differential interference contrast image that has the confocal effect can be obtained only by forming the differential image from the two images of ±θ including the blurred image components. Since the confocal microscope discussed by T. Wilson et al. is such that the spacing between confocal apertures is decreased, the efficiency of utilization of a light source is improved and phase information with a high S/N ratio can be obtained. However, T. Wilson et al. state that when the spacing between confocal apertures is decreased, it is necessary to arrange the apertures at random in order to eliminate the blurred image components. This makes it difficult to fabricate the aperture member. In the present invention, by contrast, the blurred image components, which have the same characteristics as the intensity information, are eliminated by forming the differential image from the two images of ±θ and the effect of this does not depend on the configuration and arrangement of a group of minute aperture of the aperture member. Thus, even when the aperture member with a group of minute apertures is shaped into a slit- or lattice-like form that makes its fabrication easy, the same effect is obtained.

According to the present invention, therefore, the efficiency of utilization of light from a light source can be improved by constructing the DIC microscope. In order to obtain phase information that has the confocal effect, it is only necessary to use the two images of ±θ in which the amounts of phase differences are equal, but have opposite signs. Hence, a processing speed for obtaining the phase information that has the confocal effect, in contrast with that of a conventional microscope, can be increased about twice. Furthermore, since the configuration of the group of minute apertures of the aperture member can be simplified, the fabrication of the aperture member can be facilitated.

T. R. Corle et al. suggest that in the Nipkow disk scanning confocal microscope, a differential image is formed from two differential interference contrast images in which the amounts of phase differences differ by π and thereby phase information can be extracted. With the technique discussed by T. R. Corle et al., however, the phase information cannot be extracted even though the differential image is formed under any condition, with the exception of the case where the amounts of phase differences are π/2 and 3π/2.

As such, a general technique of extracting the phase information that has the confocal effect from the Nipkow disk scanning confocal DIC microscope is not disclosed. In particular, when the amount of shear is decreased, the amounts of phase differences are set to differ by π/2 and thereby the phase components of the differential interference contrast images can be maximized. In this case, however, the influence of the bright-field components is remarkable, and the S/N ratio in phase extraction cannot be improved because of the dynamic range of an image sensor. As mentioned above, when the amount of shear is decreased, there is the need to set the amounts of phase differences to be less than π/2 in order to improve the S/N ratio.

Thus, if light-blocking areas are provided in a predetermined range along the direction of rotation of the aperture member, a phase condition of a phase changer can be reversed while the light-blocking areas are irradiated with light. Hence, light incident on the image sensor can be blocked while the phase condition of the phase changer is changed, and consequently, it becomes possible to further improve the S/N ratio in phase extraction.

When the construction that light from the illumination optical system and light from the imaging optical system are transmitted through a common aperture member is combined with the technique that the differential image is formed from the two differential interference contrast images in which the amounts of phase differences differ by π, a confocal DIC microscope can be constructed, so that the S/N ratio in phase extraction can be further improved.

In the DIC microscope, the direction of separation of the polarized component is termed a shear direction, and phase information differentiated in only the shear direction is obtained as an image. Hence, the sensitivity of phase detection is highest in the shear direction. In the confocal microscope, the confocal effect is governed by the time of movement of the apertures, and thus if the direction of movement of the apertures is made to coincide with the shear direction, the sensitivity of phase detection can be maximized and detection with a high sensitivity becomes possible.

If the phase-contrast microscope, like the DIC microscope, is constructed so that the aperture member including a plurality of minute apertures whose positions are changed with time is placed at the image plane of the imaging optical system or its conjugate plane, light from a place other than the observation object surface can be eliminated. In particular, where an object in which a great degree of scattering of light is caused as in the interior of the living body is observed, the influence of scattered light emanating from consecutive layers of the object can be lessened.

If the amount of phase of the phase plate is rendered variable, phase extraction becomes possible in the phase-contrast microscope.

An image sensor for picking up the magnified image of the observation object through the aperture member placed at the image plane of the imaging optical system or its conjugate plane is placed to form at least two phase-contrast images in which the amounts of phase differences by the phase plate are nearly equal, but have different signs. Subsequently, the differential calculation is performed with respect to respective pixels from the two phase-contrast images to form the differential image. By doing so, the phase information can be extracted from an image in which the influence of scattered light is lessened, and phase detection with a high S/N ratio becomes possible. In this way, a phase-contrast image that has the confocal effect can be observed.

If an arrangement is made so that both light from the illumination optical system and light from the imaging optical system are transmitted through the aperture member, a confocal phase-contrast microscope can be constructed by providing confocal illumination. Thus, the confocal effect can be improved and phase extraction with a high S/N ratio becomes possible.

When the aperture pattern of the aperture member is shaped into a form of a group of minute lattice-like apertures, a group of minute slit-like apertures, a group of irregularly arranged, minute apertures, or a plurality of groups of minute circular apertures, the aperture pattern is simplified and the fabrication efficiency of the aperture member can be increased.

When light-blocking areas are provided in a predetermined range along the direction of rotation of the aperture member, a phase condition of a phase changer can be reversed while the light-blocking areas are irradiated with light, and light incident on the image sensor can be blocked while the phase condition of the phase changer is changed. Consequently, the S/N ratio in phase extraction can be improved.

A light source modulated with time, such as a stroboscopic source, is used to provide illumination whose intensity is changed with time. Under such incoherent illumination whose intensity is changed with time, phase extraction is performed through a group of minute apertures of the aperture member. By doing so, when the differential interference contrast image or phase-contrast image for phase extraction is detected, the influence of leakage light from a point other than that to be observed is lessened and the S/N ratio in phase extraction can be improved. Moreover, the confocal effect of an image obtained by the phase extraction can also be improved.

If an attempt is made to synchronize an intensity change of the light source with the movement of the group of minute apertures of the aperture member, the influence of leakage light from a point other than that to be observed is lessened when the differential interference contrast image or phase-contrast image for phase extraction is detected, and the S/N ratio in phase extraction can be improved. Moreover, the confocal effect of an image obtained by the phase extraction can also be improved.

Where a phase distribution in a light-scattering substance such as a living body is detected, phase information from which the influence of scattered light is eliminated can be detected.

The specific embodiments of the present invention constructed as mentioned above will be described below.

First Embodiment

Figure 3:
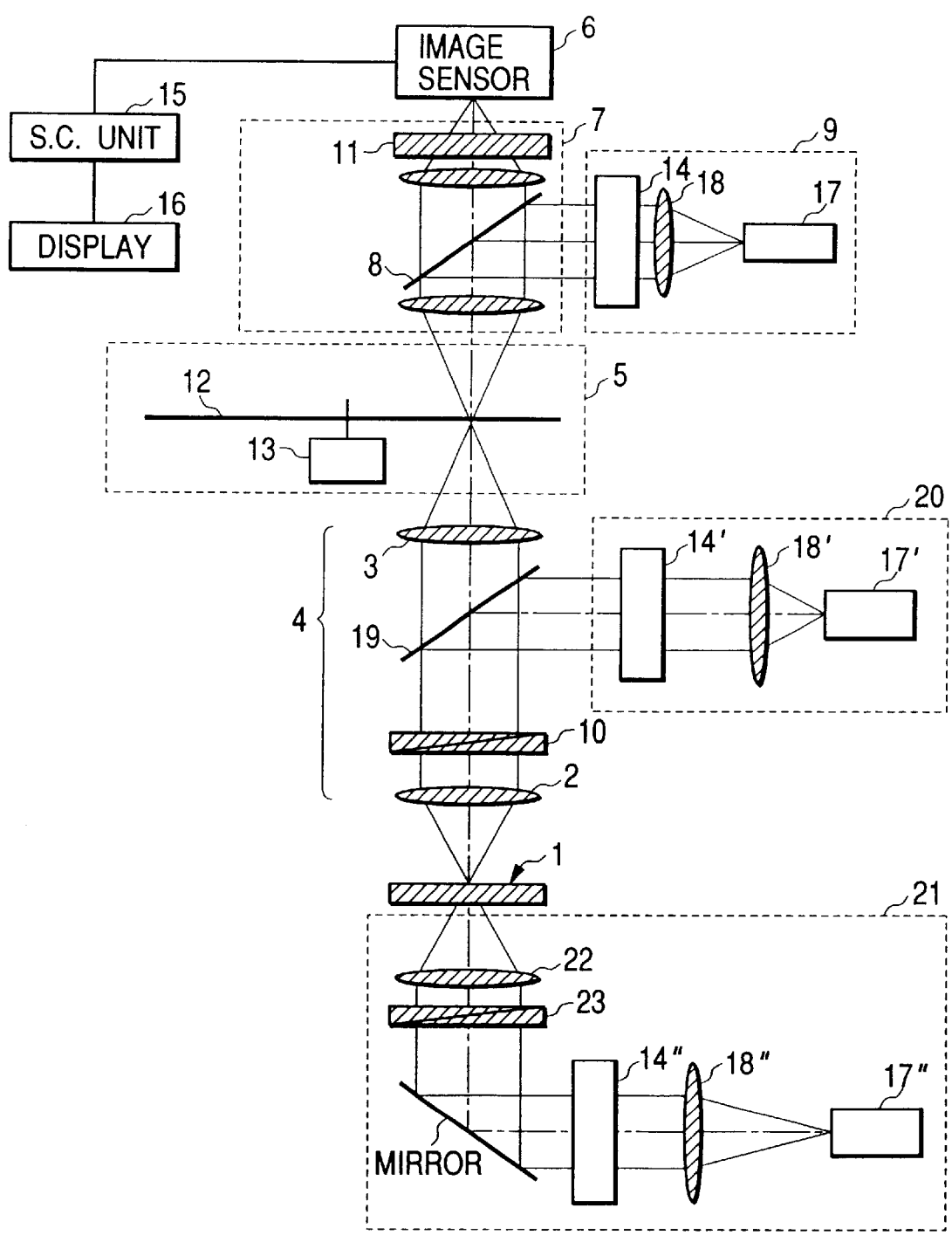
FIG. 3 is a view showing schematically the construction of a DIC microscope in a first embodiment of the present invention.

FIG. 3 shows schematically the construction of a DIC microscope in the first embodiment of the present invention. The microscope of the first embodiment is constructed so that light from a specimen 1 which is an observation object is rendered parallel by an objective lens 2 and an infinity-corrected optical system for forming the image of the specimen 1 through an imaging lens 3 is placed in an imaging optical system 4. This construction is the same as that of an ordinary upright microscope.

A description is first given of the case where a confocal illumination optical system is used for the illumination optical system of the microscope of the first embodiment.

An aperture pattern disk 12, which is an aperture member provided with a group of minute apertures in its aperture area, is located at the focal position of the imaging lens 3, namely at the image plane of the imaging optical system or its conjugate plane. A relay optical system 7 is disposed so that light transmitted through the group of minute apertures of the aperture pattern disk 12 is imaged on the light-receiving surface of an image sensor 6. A half mirror 8 is provided in the relay optical system 7 so that the surface of the observation object (specimen) 1 can be illuminated through the half mirror 8 and the aperture pattern disk 12 by a confocal illumination optical system 9. In addition, a Nomarski prism 10, as a light-separating and light-combining means, is placed in the imaging optical system 4 so that light from a light source is separated into orthogonally polarized components and when separated polarized components are reflected by the specimen 1 and are incident on the Nomarski prism 10, the separated polarized components are combined. In the relay optical system 7, an analyzer 11, as a polarized-light extracting means, is disposed so that only a particular polarized component is derived from a combined polarized component. In this way, a reflecting differential interference observation can be carried out.

A scanning unit 5 includes the aperture pattern disk 12 in which a group of minute apertures is configured and a rotary drive 13 such as a motor for rotating the aperture pattern disk 12. The aperture pattern disk 12 is constructed so that light is transmitted through the group of minute apertures and is blocked off in an area other than that of the group of minute apertures. When a Nipkow disk is used as the aperture pattern disk 12, a Nipkow disk scanning confocal DIC microscope can be constructed.

A phase changer 14 for changing the phase difference between the orthogonally polarized components is placed in the confocal illumination optical system 9. The illumination optical system of the present invention further includes a store and calculation unit 15 for storing and calculating the image of the observation object picked up by the image sensor 6 and a display 16 for displaying a calculated image. Also, the confocal illumination optical system 9 is provided with a light source 17 and a collector lens 18.

Figure 4A:
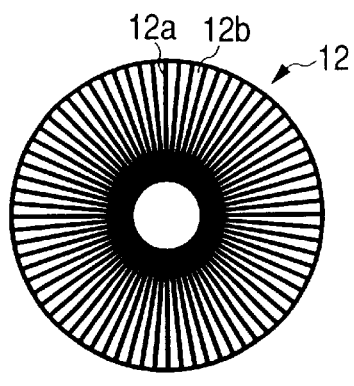
FIGS. 4A, 4B, 4C, 4D, 4E, and 4F are plan views showing the aperture shapes of aperture pattern disks used in respective embodiments of the present invention.

The aperture pattern disk 12 includes any one of the aperture patterns of groups of minute apertures described below. A slit-like aperture pattern, as shown in FIG. 4A, is provided with alternate light-transmitting and light-blocking areas (aperture section) arranged along the direction of rotation, extending radially from about the center of rotation of the aperture pattern disk 12 to the periphery thereof. A lattice-like aperture pattern, as shown in FIG. 4C, is provided with alternate light-transmitting and light-blocking areas arranged along the direction of rotation, extending radially from about the center of rotation of the aperture pattern disk 12 to the periphery thereof so that their boundaries are formed concentrically in the range from about the center of rotation of the aperture pattern disk 12 to the periphery thereof. A circular aperture pattern, as shown in FIG. 4E, is such that circulars are formed on the lattice. Two differential interference contrast images that the amounts of retardation are $\pm\theta$ are formed by the phase changer 14, and a differential image is formed by performing a differential calculation with respect to respective pixels corresponding to two pieces of image information through the store and calculation unit 15.

By doing so, the efficiency of utilization of light from a light source, which has been thought of as a problem in the Nipkow disk scanning confocal microscope, can be improved. Moreover, by forming the differential image, the bright-field components can at the same time be eliminated, and thus the same effect as in the technique disclosed by T. Wilson et al. can be obtained with a simple configuration of a group of minute apertures illustrated in each of FIGS. 4A, 4C, and 4E.

In this case, when the aperture pattern shown in FIG. 4A is used for the aperture pattern disk 12, the efficiency of utilization of light from a light source can be maximized. However, the confocal effect decreases progressively in going from the center of the pattern to the periphery. When the aperture pattern disk 12 of the aperture form shown in each of FIGS. 4C and 4E is used, the efficiency of utilization of light becomes lower than in the case of the pattern of FIG. 4A, but the confocal effect can be improved.

If a control unit (for example, a computer), although omitted from FIG. 3, is used to generally control the phase changer 14, the rotary drive 13 of the scanning unit 5, the image sensor 6, and the store and calculation unit 15, processing time required to display the image can be reduced.

Figure 4B:
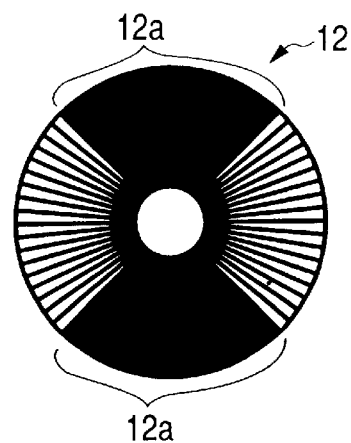
Figure 4C:
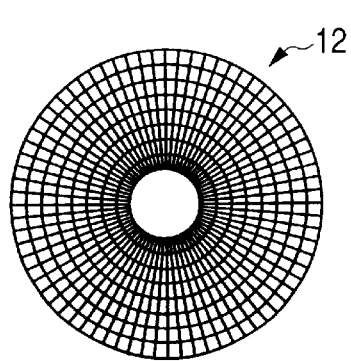
Figure 4D:
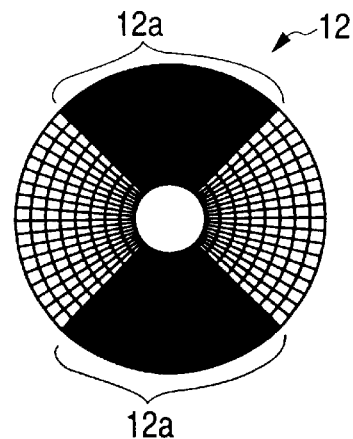
Figure 4E:
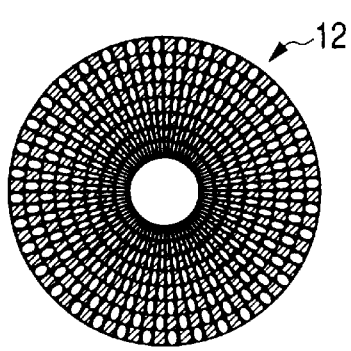
Figure 4F:
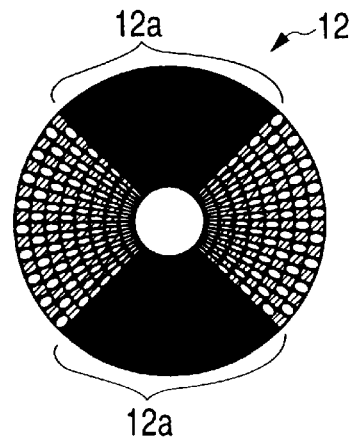

As depicted in each of FIGS. 4B, 4D, and 4F, when the aperture pattern disk 12 is provided with a light-blocking portion 12a along the direction of rotation, the amount of retardation is changed while the light-blocking portion 12a is irradiated with light from the light source. The light-blocking portion 12a has a wider light-blocking region than the light-blocking areas. Light incident on the image sensor can be blocked while the phase condition of the phase changer 14 is changed. Thus, the influence of the change of the amount of retardation on the image can be eliminated.

When the specimen 1 is an object in which a great degree of scattering of light is caused as in the interior of a living body, confocal illumination is spread unnecessarily by the influence of scattering, and the confocal effect is lessened as in the case where the spacing between confocal apertures is decreased.

However, scattered light is considered to be in a state of random phase and can be treated as intensity information like bright-field information. Even when the object which causes a great degree of scattering of light is illuminated by the confocal illumination optical system, the influence of scattering can be excluded if the differential image is formed to perform phase detection, and thus the confocal effect can be heightened.

However, where the object in which light is strongly scattered as in the interior of a living body is observed with confocal illumination, it is necessary to improve the efficiency of utilization of light from a light source even in order to compensate a decrease of the intensity of the phase component due to scattering.

Hence, the aperture pattern disk 12 shown in each of FIGS. 4A–4F is used to improve the efficiency of utilization of light, and thereby the influence of scattered light can be lessened in the case of the observation of the object that light is strongly scattered as in the interior of a living body.

Subsequently, reference is made to the case where a reflecting illumination optical system is used for the illumination optical system of the microscope of the first embodiment. In FIG. 3, a half mirror 19 is interposed between the objective lens 2 and the imaging lens 3 of the imaging optical system 4 so that reflecting illumination is performed through the half mirror 19 by a reflecting illumination optical system 20. Also, the reflecting illumination optical system 20 includes a light source 17', a collector lens 18', and a phase changer 14'.

A DIC microscope is constructed so that light from the specimen 1 illuminated by the reflecting illumination optical system 20 can be picked up through the group of minute apertures of the aperture pattern disk 12 by the image sensor 6. In this instance, like the case where the confocal illumination optical system mentioned above is used, the phase changer 14' placed in the reflecting illumination optical system 20 is used to change the amount of retardation, and the differential interference contrast images of ±θ are formed so that the differential image is formed and phase information is extracted.

The use of a reflecting illumination mode gives rise to uniform three-dimensional illumination inside the specimen 1. When the intensity information of light is observed, therefore, the interior of the specimen 1 is affected by light from a position other than that of the surface of the specimen which comes into question.

However, when the phase information is detected, light existing outside the limit of the focal depth of the imaging optical system is in a state of random phase and behaves as the intensity information. Here, if the differential image is formed to extract the phase information, the light outside the limit of the focal depth can also be eliminated as in the intensity information. Thus, by forming the differential image, only information within the focal depth can be extracted.

A phase distribution on the surface of the specimen illuminated with partially coherent light similar to incoherent light is in a spatially independent incoherent state as in the case of a confocal illumination mode. When the phase detection of the phase distribution is made through the group of minute apertures of the aperture pattern disk 12, the same effect as in the confocal microscope can be brought about.

Furthermore, the image is formed through the group of minute apertures of the aperture pattern disk 12, and thereby the light existing outside the limit of the focal depth, as shown in FIG. 1, can be attenuated. Consequently, the intensity information component of the differential interference contrast image to be formed is attenuated and the S/N ratio of the phase information to be extracted can be heightened.

As such, even when an ordinary reflecting illumination mode is applied, the differential image formed from the images detected through the group of minute apertures of the aperture pattern disk 12, and thereby the same effect as in the confocal microscope can be obtained.

Next, reference is made to the case where a transmitting illumination optical system is used for the illumination optical system of the microscope of the first embodiment. As shown in FIG. 3, a transmitting illumination optical system 21 is provided so that the specimen 1 can be illuminated with transmitted light, and a Nomarski prism 23 as a light-separating means is located at the pupil position of a condenser lens 22 so that light from a light source 17" is separated into orthogonally polarized components and separated polarized components are combined by the Nomarski prism 10. In this way, a transmission type DIC microscope is constructed. Also, the transmitting illumination optical system 21 includes the light source 17", a collector lens 18", and a phase changer 14".

Even with the use of a transmitting illumination mode, as in the case where the reflecting illumination mode is applied, the differential image is formed from the images detected through the group of minute apertures of the aperture pattern disk 12, and thereby the same effect as in the confocal microscope can be secured. The same observation as in a transmission type confocal microscope, which has been thought of as being difficult in the past, can be performed.

Also, although various pattern forms of minute apertures where the confocal illumination optical system is used are illustrated in FIGS. 4A–4F, the efficiency of utilization of light where the transmitting or reflecting illumination mode is used is much higher than that in the confocal illumination mode, and thus even when the Nipkow disk is used for the aperture pattern disk 12, a sufficient amount of light is obtained and a bright image that has an effect equal to that of the confocal illumination microscope can be formed.

Moreover, by using the aperture pattern disk 12 that has light-blocking areas along the direction of rotation as shown in each of FIGS. 4B, 4D, and 4F, the influence of a change of the amount of retardation on an image can be lessened.

Figure 5A:
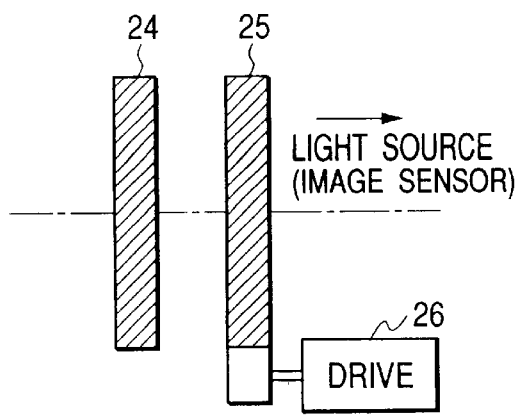
FIGS. 5A, 5B, 5C, and 5D are views showing the constructions of phase changers used in DIC microscope of the first embodiment.

The construction examples of the phase changers used in the first embodiment are shown in FIGS. 5A–5D. A phase changer shown in FIG. 5A is designed so that a quarter-wave plate 24 is fixed and a drive 26, such as a motor, is connected to a polarizer 25 that can be rotated about the optical axis and is capable of controlling the rotation thereof. In this instance, the angle of rotation of the polarizer 25 is made to correspond to the amount of retardation.

Figure 5B:
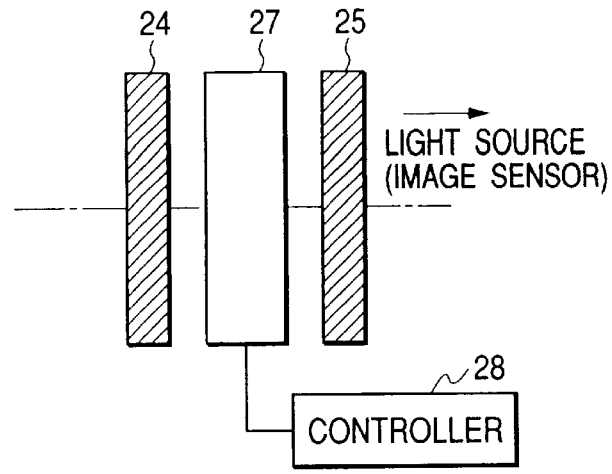

A phase changer in FIG. 5B is constructed so that the quarter-wave plate 24 and the polarizer 25 are fixed to interpose a liquid crystal element 27 between them and a liquid crystal controller 28 is connected to the liquid crystal element 27 to change a voltage applied to the liquid crystal element 27 and rotate the plane of vibration of polarized light transmitted through the liquid crystal element 27. In this case, the voltage applied to the liquid crystal element 27 is changed to alter the amount of retardation.

Figure 5C:
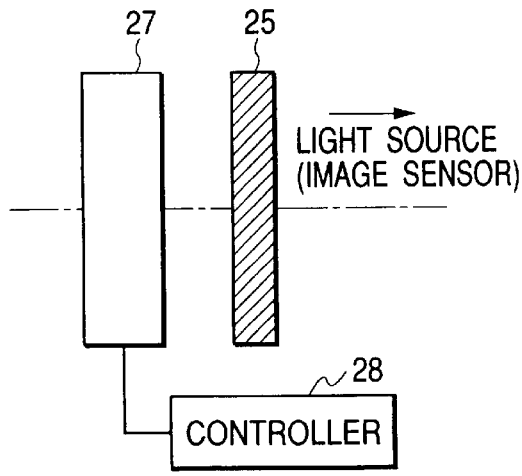

A phase changer in FIG. 5C is such that the quarter-wave plate 24 is removed from the construction of FIG. 5B and the Nomarski prism 10 shown in FIG. 3 possesses the function of the quarter-wave plate 24.

Figure 5D:
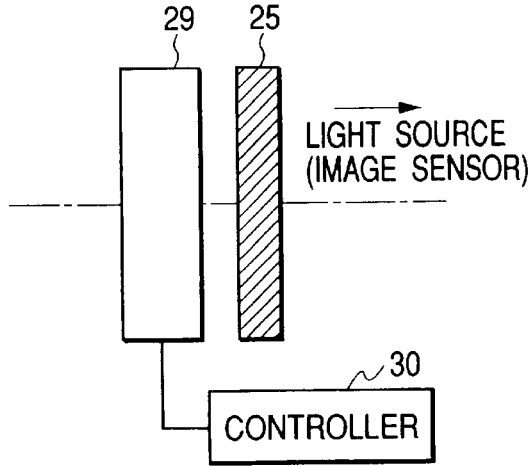

A phase changer in FIG. 5D is such that, instead of the liquid crystal element 27 and the liquid crystal controller 28 in FIG. 5C, an electro-optical element 29 and a controller 30 are provided and an electrical characteristic imparted to the electro-optical element 29 is changed, thereby altering the amount of retardation.

Also, although in the first embodiment shown in FIG. 3 the phase changers 14, 14', and 14" are disposed in the illumination optical systems 9, 20, and 21, respectively, this arrangement is made to facilitate a comprehension of the present invention, and even though the analyzer 11 of the relay optical system 7 and each of the phase changers 14, 14', and 14" are replaced with each other, the same effect can be obtained.

The sensitivity of phase detection in the DIC microscope is maximized in the shear direction, and hence in order to improve the S/N ratio of phase extraction, it is favorable that the direction of movement of the group of minute apertures configured on the aperture pattern disk 12 of the scanning unit 5 is made to coincide with the shear direction.

Also, although the first embodiment shown in FIG. 3 is provided with all the confocal, reflecting, and transmitting illumination modes, the present invention need not necessarily have all of these and it is only necessary to have at least one illumination mode. However, when three kinds of illumination optical systems are provided as shown in FIG. 3, they are selectively used, and thereby phase information can be derived from any specimen whatever.

Furthermore, if a light source emitting infrared rays is used as an illumination source, the influence of scattering can be lessened when an object in which light is strongly scattered as in the interior of a living body is observed, and the SIN ratio can be further improved.

Second Embodiment

Figure 6:
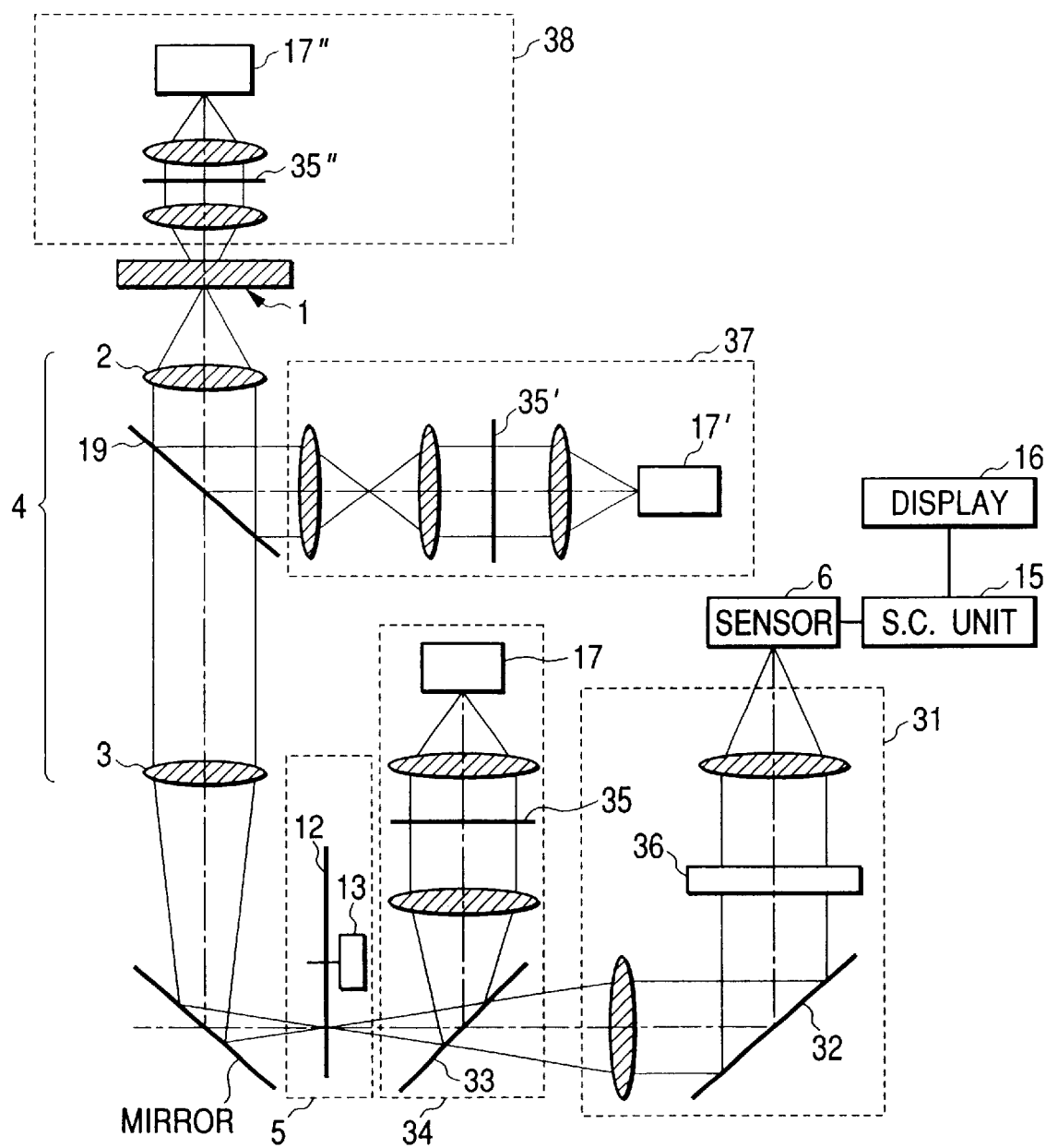
FIG. 6 is a view showing schematically the construction of a phase-contrast microscope in a second embodiment of the present invention.

FIG. 6 shows schematically the construction of a phase-contrast microscope in the second embodiment of the present invention. The microscope of the second embodiment is constructed so that light from the specimen 1 is rendered parallel by the objective lens 2 and an infinity-corrected optical system for forming the image of the specimen 1 through the imaging lens 3 is placed in the imaging optical system 4. This construction is the same as that of an ordinary inverted microscope.

A description is first given of the case where a confocal illumination optical system is used for the illumination optical system of the microscope of the second embodiment. The inverted microscope is designed so that a primary image formed by the objective lens 2 and the imaging lens 3 is relayed to a secondary image by a relay optical system 31 and an inverted image is formed. The relay optical system 31 is such that an image is inverted by providing a mirror 32 between relay lenses, for instance. At a position where the primary image is formed, that is, at the image plane of the imaging optical system 4 or its conjugate plane, the group of minute apertures of the aperture pattern disk 12 are arranged. A half mirror 33 is interposed between the primary image and the relay optical system 31 so that the specimen 1 can be irradiated with illumination light from a confocal illumination optical system 34 through the group of minute apertures of the aperture pattern disk 12.

A phase-contrast aperture 35 is disposed at a position conjugate with the pupil of the objective lens 2 in the confocal illumination optical system 34. A phase changer 36 is located at a position conjugate with the pupil of the objective lens 2 in the relay optical system 31, that is, at a position conjugate with the phase-contrast aperture 35, so that a phase-contrast observation can be carried out.

Even with the phase-contrast microscope of the second embodiment, like the DIC microscope discussed in the first embodiment, an arrangement is made so that the specimen 1 is illuminated confocally through the group of minute apertures of the aperture pattern disk 12 and light reflected by the specimen 1 is imaged through the group of minute apertures of the aperture pattern disk 12 by the image sensor 6. When the Nipkow disk is used for the aperture pattern disk 12 of the scanning unit 5, a phase-contrast image that has a confocal effect is obtained.

In particular, the phase-contrast microscope, in contrast with the DIC microscope that has no vertical detection sensitivity in the shear direction, is capable of performing phase detection with a detection sensitivity in any direction, that is, with no directivity.

Two phase-contrast images in which phases are reverted by the phase changer 36 are produced to form a differential image. Consequently, phase information that has a confocal effect can be extracted.

For the aperture patterns of groups of minute apertures of the aperture pattern disk 12, there are the slit-like aperture pattern shown in FIG. 4A, the lattice-like aperture pattern shown in FIG. 4C, and the circular aperture pattern shaped into a lattice-like form as shown in FIG. 4E. By using each of these patterns, as in the embodiment of the DIC microscope, the efficiency of utilization of light from a light source which has come into disadvantage in the Nipkow disk scanning confocal microscope can be improved. In addition, since the differential image is formed and thereby the bright-field component can at the same time be eliminated, the same effect as in the confocal microscope disclosed by T. Wilson et al. can be achieved by a simple configuration of a group of apertures shown in each of FIGS. 4A, 4C, and 4E. Also, in FIG. 4E, the group of minute apertures, which are regularly arranged, may have an irregular arrangement.

When an object in which a great degree of scattering of light is caused as in the interior of a living body is observed by the confocal illumination mode, it is necessary to improve the efficiency of utilization of light from a light source even in order to compensate a decrease of the intensity of the phase component due to scattering. However, if the aperture pattern disk 12 such as that shown in each of FIGS. 4A–4F is used to improve the efficiency of utilization of light from a light source, the influence of scattered light can be lessened when the object in which light is strongly scattered as in the interior of living body is observed.

Subsequently, reference is made to the case where a reflecting illumination optical system is used for the illumination optical system of the microscope of the second embodiment. In FIG. 6, the half mirror 19 is interposed between the objective lens 2 and the imaging optical system 3 so that a reflecting illumination optical system 37 capable of providing reflecting illumination through the half mirror 19 is constructed. A phase-contrast aperture 35' is located at a position conjugate with the pupil of the objective lens 1 in the reflecting illumination optical system 37 and thereby a reflecting phase-contrast observation becomes possible.

In the second embodiment, as in the case of the DIC microscope discussed in the first embodiment, when the specimen 1 is the object in which a great degree of scattering of light is caused, the differential image is formed to extract the phase information. Consequently, light existing outside the limit of the focal depth is also eliminated as in the intensity information, and only information within the focal depth can be extracted.

Furthermore, since the image is formed through the group of minute apertures and thereby, as shown in FIG. 1, light outside the limit of the focal depth can be attenuated, the intensity information component of the phase-contrast image to be formed is weakened and the S/N ratio of the phase information to be extracted can be improved.

Thus, even when an ordinary reflecting illumination mode is used, the differential image is formed from the image detected through the group of minute apertures of the aperture pattern disk 12, and thereby the same effect as in the confocal microscope can be achieved. In particular, when the form of an IC pattern constructed on a semiconductor wafer is observed, the influence of scattered light caused by a pattern with a large step can be excluded, which is effective. Moreover, this technique is also effective for the measurement of an object producing birefringence, such as resin formed on a metal surface.

Next, reference is made to the case where a transmitting illumination optical system is used in the second embodiment. As shown in FIG. 6, a transmitting illumination optical system 38 is provided so that the specimen 1 can be illuminated with transmitted light, and a phase-contrast aperture 35" is located at a position conjugate with the pupil position of the objective lens 2 in the transmitting illumination optical system 38. In this way, a transmission type phase-contrast microscope is constructed.

Even with the use of the transmitting illumination mode, like the reflecting illumination mode, the differential image is formed from the images detected through the group of minute apertures of the aperture pattern disk 12, and thereby the same effect as in the confocal microscope can be achieved. Furthermore, an observation that has the same effect as in the transmission type confocal microscope, which has been thought of as being difficult in the past, can be performed.

Also, although various pattern forms of minute apertures are shown in FIGS. 4A–4F, the efficiency of utilization of light where the transmitting or reflecting illumination mode is used is much higher than that in the confocal illumination mode, and thus even when the Nipkow disk is used for the aperture pattern disk 12, a sufficient amount of light is obtained and a bright image that has an effect equal to that of the confocal illumination microscope can be formed.

By using the aperture pattern disk that has the light-blocking areas shown in each of FIGS. 4B, 4D, and 4F, the influence of a change of the amount of phase difference on the image can be eliminated.

Also, although the second embodiment shown in FIG. 6 is provided with all the confocal, reflecting, and transmitting illumination modes, the present invention need not necessarily have all of these and it is only necessary to have at least one illumination mode. However, when three kinds of illumination optical systems are provided as shown in FIG. 6, they are selectively used, and thereby phase information can be derived from any specimen whatever. By selecting the phase-contrast aperture and the phase changer in accordance with the structure of a specimen to be observed, the phase extraction can be performed more effectively.

Figure 7A:
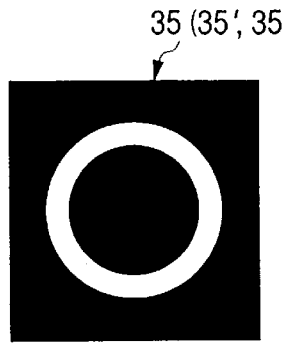
FIGS. 7A and 7B are views showing the shape of a phase-contrast aperture and the construction of a phase changer, respectively, used in the phase-contrast microscope of the second embodiment.
Figure 7B:
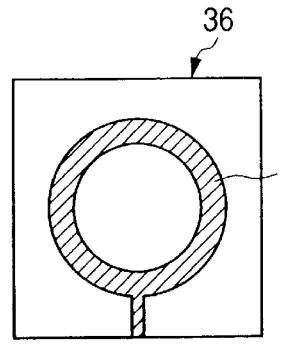
Figure 7C:
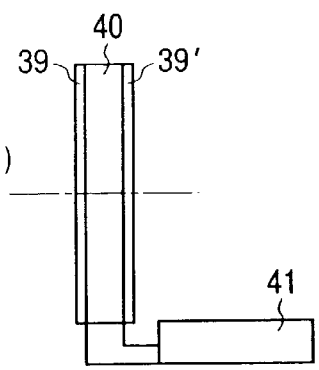
FIG. 7C is a side view showing the phase changer of FIG. 7B.

FIGS. 7A–7C, 8A–8C, and 9A–9C show construction examples of the phase-contrast apertures 35, 35', and 35" and the phase changer 36. A ring phase-contrast aperture shown in FIG. 7A is used in an ordinary phase-contrast microscope. A phase changer corresponding to this aperture is shown in FIGS. 7B and 7C. The phase changer is constructed in such a way that transparent electrodes 39 and 39' are configured into forms similar to the aperture form of FIG. 7A and a liquid crystal element 40 is sandwiched between the transparent electrodes 39 and 39'. A voltage applied to the liquid crystal element 40 is controlled by a liquid crystal controller 41 so that the amount of phase difference is adjusted.

Figure 8A:
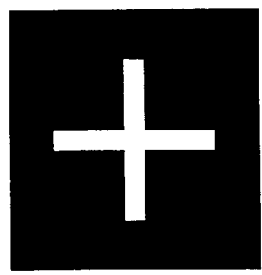
FIGS. 8A and 8B are views showing the shape of a phase-contrast aperture and the construction of a phase changer, respectively, in another example, used in the phase-contrast microscope of the second embodiment.
Figure 8B:
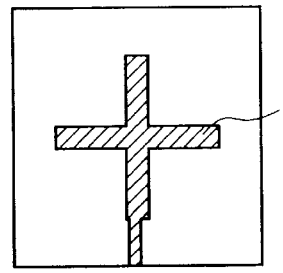
Figure 8C:
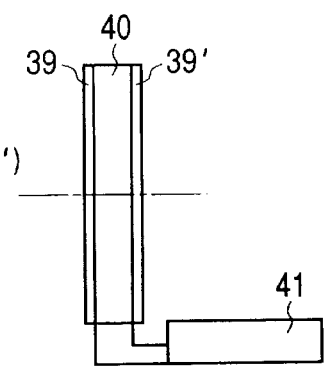
FIG. 8C is a side view showing the phase changer of FIG. 8B.

A phase-contrast aperture shown in FIG. 8A is effective in the case where a spot on a specimen surface is shaped into such a form that the pattern of this aperture is rotated 45° around the optical axis (the center of a cross) and a specimen is rectangular. A phase changer corresponding to the phase-contrast aperture of FIG. 8A is shown in FIGS. 8B and 8C.

Figure 9A:
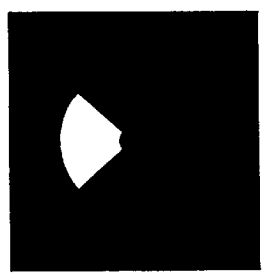
FIGS. 9A and 9B are views showing the shape of a phase-contrast aperture and the construction of a phase changer, respectively, in still another example, used in the phase-contrast microscope of the second embodiment.
Figure 9B:
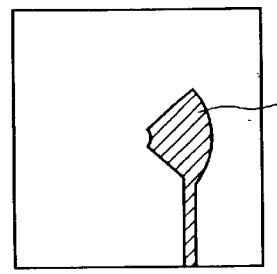
Figure 9C:
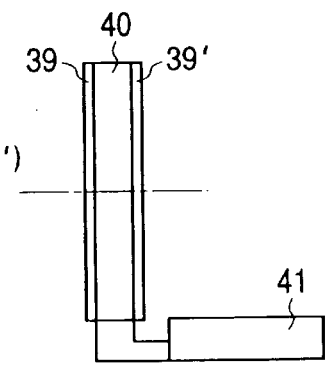
FIG. 9C is a sides view showing the phase changer of FIG. 9B.

A phase-contrast aperture shown in FIG. 9A is shaped like a sector, and a phase changer corresponding to this aperture is shown in FIGS. 9B and 9C. The aperture provides oblique illumination and a phase-contrast image formed through the aperture has a relief sensibility as in the DIC microscope. Thus, a combination of the phase-contrast aperture with the phase changer in FIGS. 9A and 9B is effective in the case where an image such as that in differential interference is required.

Even with the phase-contrast microscope, when a light source emitting infrared rays is used as an illumination source, the influence of scattering can be lessened, and the S/N ratio in phase extraction can be improved.

If the light source emitting infrared rays, transmitted through a silicon wafer, is used, a transmission observation of the silicon wafer can be carried out. According to the microscope of the second embodiment, therefore, it becomes possible to observe the interior of a lamination pattern formed on the silicon wafer. Moreover, since scattering of light caused by the lamination pattern and the surface of the silicon wafer can be eliminated, it becomes possible to observe the interior of the lamination pattern with a higher degree of accuracy.

In the present invention, a stroboscopic source is used for the light source of the illumination optical system, and light from the light source is blinked to modulate its intensity with time. In addition, a controller like a computer, not shown, is used to control the blinking time of the light source so that it is synchronized with the rotation of the aperture pattern disk.

This control technique is described below, citing the aperture pattern of FIG. 4A as an example. Markers are applied to aperture portions 12b of slits and light-blocking portions 12c of the aperture pattern disk 12, and a control means, not shown, is used to control synchronization so that when the markers reach a particular position, the light source emits light. By doing so, the same illumination as in the case where the aperture portions of slits are scanned is obtained, and the same effect as in the confocal illumination is achieved. Thus, phase detection that has an effect identical with the case of the confocal microscope can be performed.

What is claimed is:

1. An optical apparatus comprising:

a light source;

an illumination optical system for leading light emitted from said light source to an object to be observed;

an imaging optical system for magnifying and projecting an image of said object;

an aperture member which is rotatable, disposed at an image plane of said imaging optical system or a conjugate plane thereof, and having an aperture section constructed with light-transmitting areas and light-blocking areas;

a light-separating means for separating the light emitted from said light source into orthogonally polarized components;

a light-combining means for combining the polarized components separated by said light-separating means, disposed in said imaging optical system;

a polarized-light extracting means for deriving only a particular polarized component, interposed between said light-combining means and the image plane of said imaging optical system;

an image sensor for picking up a magnified image of said object projected on the image plane of said imaging optical system;

an image processor for storing an image obtained by said image sensor and using the image to perform a calculation; and a phase changer for changing a phase difference between the orthogonally polarized components, interposed between said light source and said light-separating means or between said light-combining means and said image sensor, wherein the light-transmitting areas and the light-blocking areas of said aperture member have boundaries formed in the range from a vicinity of a center of rotation of said aperture member to a vicinity of a periphery thereof so that a differential image is formed by performing a differential calculation with respect to respective corresponding pixels from at least two differential interference contrast images in which amounts of phase differences between respective two polarized components are substantially equal, but have different signs.

2. An optical apparatus comprising:

a light source;

an illumination optical system for leading light emitted from said light source to an object to be observed;

an imaging optical system for magnifying and projecting an image of said object;

an aperture member which is rotatable, disposed at an image plane of said imaging optical system or a conjugate plane thereof, and having an aperture section constructed with light-transmitting areas and light-blocking areas;

a light-separating means for separating the light emitted from said light source into orthogonally polarized components;

a light-combining means for combining the polarized components separated by said light-separating means, disposed in said imaging optical system;

a polarized-light extracting means for deriving only a particular polarized component, interposed between said light-combining means and the image plane of said imaging optical system;

an image sensor for picking up a magnified image of said object projected on the image plane of said imaging optical system;

an image processor for storing an image obtained by said image sensor and using the image to perform a calculation; and a phase changer for changing a phase difference between the orthogonally polarized components, interposed between said light source and said light-separating means or between said light-combining means and said image sensor, wherein the light-transmitting areas and the light-blocking areas of said aperture member have boundaries formed in the range from a vicinity of a center of rotation of said aperture member to a vicinity of a periphery thereof and boundaries shaped like concentric circles so that a differential image is formed by performing a differential calculation with respect to respective corresponding pixels from at least two differential interference contrast images in which amounts of phase differences between respective two polarized components are substantially equal, but have different signs.

3. An optical apparatus comprising:

a light source;

an illumination optical system for leading light emitted from said light source to an object to be observed;

an imaging optical system for magnifying and projecting an image of said object;

an aperture member which is rotatable, disposed at an image plane of said imaging optical system or a conjugate plane thereof, and having an aperture section constructed with light-transmitting areas and light-blocking areas;

a light-separating means for separating the light emitted from said light source into orthogonally polarized components;

a light-combining means for combining the polarized components separated by said light-separating means, disposed in said imaging optical system;

a polarized-light extracting means for deriving only a particular polarized component, interposed between said light-combining means and the image plane of said imaging optical system;

an image sensor for picking up a magnified image of said object projected on the image plane of said imaging optical system;

an image processor for storing an image obtained by said image sensor and using the image to perform a calculation; and a phase changer for changing a phase difference between the orthogonally polarized components, interposed between said light source and said light-separating means or between said light-combining means and said image sensor, wherein the light-transmitting areas of said aperture member are shaped into a plurality of minute apertures having substantially circular forms so that a differential image is formed by performing a differential calculation with respect to respective corresponding pixels from at least two differential interference contrast images in which amounts of phase differences between respective two polarized components are substantially equal, but have different signs, and wherein said illumination optical system is disposed on an opposite side of said image sensor with respect to said aperture member which is rotatable.

4. An optical apparatus according to any one of claim 1, 2, or 3, wherein said apertures member has a light-blocking portion formed adjacent to said aperture section.

5. An optical apparatus according to any one of claims 1, 2, or 3, wherein light from said illumination optical system and light from said imaging optical system are both transmitted through said aperture member.

6. An optical apparatus according to any one of claim 1, 2, or 3, wherein said aperture member has a rotary drive and is rotated through said rotary drive so that a direction of movement of said aperture section is substantially identical with a direction of separation of the polarized components produced by said light-separating means.

7. An optical apparatus according to any one of claim 1, 2, and 3, wherein said light source is a light source whose intensity changes with time.

8. An optical apparatus according to claim 7, wherein an intensity change of said light source is synchronized with a movement of a group of minute apertures of said aperture member.

9. An optical apparatus according to any one of claim 1, 2, and 3, wherein a phase distribution in a light-scattering substance is observed.

10. A microscope comprising:

a light source;

an illumination optical system for leading light from said light source to an object to be observed;

an imaging optical system for magnifying and projecting an image of said object;

an aperture located at a pupil position of said illumination optical system; and a phase plate located at a predetermined position in said imaging optical system, said predetermined position being conjugate with the position of said aperture, wherein said microscope further includes an aperture member having a plurality of minute apertures whose positions are changed with time, said aperture member being placed at an image plane of said imaging optical system or a conjugate plane thereof, and wherein said phase plate has a portion that changes a phase of light and that is shaped to be geometrically similar to an opening of said aperture.

11. A microscope according to claim 10, wherein an amount of phase of said phase plate is variable.

12. A microscope according to claim 11, wherein an image sensor for picking up a magnified image of said object through an aperture member located at an image plane of said imaging optical system or a conjugate plane thereof is placed to form at least two phase-contrast images in which amounts of phase differences by said phase plate are substantially equal, but have different signs so that a differential calculation is performed with respect to respective pixels from the two phase-contrast images to form a differential image.

13. A microscope according to claim 12, wherein light from said illumination optical system and light from said imaging optical system are both transmitted through said aperture member.

14. A microscope according to claim 10, wherein said plurality of minute apertures form an array that is both radial and concentric with respect to a rotation center of said aperture member.

15. A microscope according to claim 10, wherein said plurality of minute apertures are slits-extending in radial directions around a rotation center of said aperture member.

16. A microscope according to claim 10, wherein said plurality of minute apertures are irregularly arranged.

17. A microscope according to claim 10, wherein said plurality of minute apertures are circular apertures.

18. A microscope according to claim 10, wherein said aperture member has said minute apertures and a light-blocking portion.

19. A microscope according to claim 10, wherein said light source is a light source whose intensity changes with time.

20. A microscope according to claim 19, wherein an intensity change of said light source is synchronized with a movement of a group of minute apertures of said aperture member.

21. A microscope according to claim 10 wherein a phase distribution in a light-scattering substance is observed.

* * * * *